(12) United States Patent
Gill

(10) Patent No.: US 6,927,948 B2
(45) Date of Patent: Aug. 9, 2005

(54) DIFFERENTIAL CPP GMR SENSOR WITH FREE LAYERS SEPARATED BY METAL GAP LAYER

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 153 days.

(21) Appl. No.: 10/349,552

(22) Filed: Jan. 23, 2003

(65) Prior Publication Data

US 2004/0145835 A1 Jul. 29, 2004

(51) Int. Cl.⁷ .................................................. G11B 5/39
(52) U.S. Cl. ...................................... 360/314; 360/322
(58) Field of Search ............................... 360/315, 317, 360/324.2, 322

(56) References Cited

U.S. PATENT DOCUMENTS

| | | | |
|---|---|---|---|
| 5,155,643 A | 10/1992 | Jones, Jr. et al. | 360/113 |
| 5,491,600 A | 2/1996 | Chen et al. | 360/113 |
| 5,557,492 A | 9/1996 | Gill et al. | 360/113 |
| 6,195,228 B1 | 2/2001 | Bennett et al. | 360/112 |
| 6,313,973 B1 | 11/2001 | Fuke et al. | 360/324.1 |
| 6,417,999 B1 | 7/2002 | Knapp et al. | 360/322 |
| 6,469,873 B1 * | 10/2002 | Maruyama et al. | 360/314 |
| 6,643,103 B1 * | 11/2003 | Trindade | 360/314 |
| 6,657,823 B2 * | 12/2003 | Kawato | 360/314 |
| 6,680,827 B2 * | 1/2004 | Li et al. | 360/314 |
| 6,693,776 B2 * | 2/2004 | Gill | 360/324.12 |
| 6,700,750 B1 * | 3/2004 | Hasegawa | 360/314 |
| 2001/0006443 A1 * | 7/2001 | Maruyama et al. | 360/314 |
| 2002/0067577 A1 * | 6/2002 | Beach et al. | 360/314 |
| 2002/0075608 A1 * | 6/2002 | Kawato | 360/314 |
| 2002/0089795 A1 | 7/2002 | Seigler et al. | 360/322 |
| 2002/0101689 A1 * | 8/2002 | Tang et al. | 360/314 |
| 2002/0159199 A1 * | 10/2002 | Gill | 360/314 |
| 2002/0191348 A1 * | 12/2002 | Hasegawa et al. | 360/314 |
| 2002/0196588 A1 * | 12/2002 | Gill | 360/314 |

* cited by examiner

Primary Examiner—Jefferson Evans
(74) Attorney, Agent, or Firm—Lewis L. Nunnelley; William D. Gill

(57) ABSTRACT

A differential current-perpendicular-to-the-plane (CPP) giant magnetoresistive (GMR) sensor is provided having nonmagnetic high conductivity leads to achieve low lead resistance. The differential CPP GMR sensor comprises a first spin valve (SV) sensor, a second SV sensor and a metal gap layer disposed between the first and the second SV sensors. Because of the differential operation of the CPP GMR sensor of this invention, there is no need for shield layers to screen the sensor from stray magnetic fields. The shield layers are replaced with thick nonmagnetic lead layers having high conductivity to reduce the lead resistance of the sensor. Suitable materials for forming the leads include tungsten (W), gold (Au), rhodium (Rh), copper (Cu) and tantalum (Ta) because of their conductivity properties and because they are robust with respect to corrosion and smearing.

6 Claims, 5 Drawing Sheets

DIFFERENTIAL CPP GMR SENSOR WITH FREE LAYERS SEPARATED BY METAL GAP LAYER

BACKGROUND OF THE INVENTION

1. Field of the Invention

This invention relates in general to magnetic transducers for reading information signals from a magnetic medium and, in particular, to a differential current-perpendicular-to-the-plane giant magnetoresistance sensor with improved non-magnetic high conductivity leads.

2. Description of Related Art

Computers often include auxiliary memory storage devices having media on which data can be written and from which data can be read for later use. A direct access storage device (disk drive) incorporating rotating magnetic disks is commonly used for storing data in magnetic form on the disk surfaces. Data is recorded on concentric, radially spaced tracks on the disk surfaces. Magnetic heads including read sensors are then used to read data from the tracks on the disk surfaces.

In high capacity disk drives, magnetoresistive (MR) read sensors, commonly referred to as MR sensors, are the prevailing read sensors because of their capability to read data from a surface of a disk at greater track and linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which an MR element resistance varies as the square of the cosine of the angle between the magnetization in the MR element and the direction of sense current flowing through the MR element. Recorded data can be read from a magnetic medium because the external magnetic field from the recorded magnetic medium (the signal field) causes a change in the direction of magnetization in the MR element, which in turn causes a change in resistance in the MR element and a corresponding change in the sensed current or voltage.

Another type of MR sensor is the giant magnetoresistance (GMR) sensor manifesting the GMR effect. In GMR sensors, the resistance of the MR sensing layer varies as a function of the spin-dependent transmission of the conduction electrons between magnetic layers separated by a non-magnetic layer (spacer) and the accompanying spin-dependent scattering which takes place at the interface of the magnetic and nonmagnetic layers and within the magnetic layers.

GMR sensors using only two layers of ferromagnetic material (e.g., Ni—Fe) separated by a layer of nonmagnetic material (e.g., copper) are generally referred to as spin valve (SV) sensors manifesting the SV effect.

FIG. 1 shows an SV sensor 100 comprising end regions 104 and 106 separated by a central region 102. A first ferromagnetic layer, referred to as a pinned layer 120, has its magnetization typically fixed (pinned) by exchange coupling with an antiferromagnetic (AFM) layer 125. The magnetization of a second ferromagnetic layer, referred to as a free layer 110, is not fixed and is free to rotate in response to the magnetic field from the recorded magnetic medium (the signal field). The free layer 110 is separated from the pinned layer 120 by a nonmagnetic, electrically conducting spacer layer 115. Hard bias layers 130 and 135 formed in the end regions 104 and 106, respectively, provide longitudinal bias for the free layer 110. Leads 140 and 145 formed on hard bias layers 130 and 135, respectively, provide electrical connections for sensing the resistance of SV sensor 100. In the SV sensor 100, because the sense current flow between the leads 140 and 145 is in the plane of the SV sensor layers, the sensor is known as a current-in-plane (CIP) SV sensor. IBM's U.S. Pat. No. 5,206,590 granted to Dieny et al. discloses a GMR sensor operating on the basis of the SV effect.

Another type of spin valve sensor is an antiparallel pinned (AP) spin valve sensor. The AP-pinned spin valve sensor differs from the simple spin valve sensor in that an AP-pinned structure has multiple thin film layers instead of a single pinned layer. The AP-pinned structure has an antiparallel coupling (APC) layer sandwiched between first and second ferromagnetic pinned layers. The first pinned layer has its magnetization oriented in a first direction by exchange coupling to the antiferromagnetic pinning layer. The second pinned layer is immediately adjacent to the free layer and is antiparallel exchange coupled with the first pinned layer because of the selected thickness (in the order of 8 (E) of the APC layer between the first and second pinned layers. Accordingly, the magnetization of the second pinned layer is oriented in a second direction that is antiparallel to the direction of the magnetization of the first pinned layer.

The AP-pinned structure is preferred over the single pinned layer because the magnetizations of the first and second pinned layers of the AP-pinned structure subtractively combine to provide a net magnetization that is less than the magnetization of the single pinned layer. The direction of the net magnetization is determined by the thicker of the first and second pinned layers. A reduced net magnetization equates to a reduced demagnetization field from the AP-pinned structure. Since the antiferromagnetic exchange coupling is inversely proportional to the net pinning magnetization, this increases exchange coupling between the first pinned layer and the antiferromagnetic pinning layer. An AP-pinned spin valve sensor is described in commonly assigned U.S. Pat. No. 5,465,185 to Heim and Parkin.

There is a continuing need to increase the MR coefficient and reduce the thickness of GMR sensors. An increase in the spin valve effect and reduced sensor geometry and reduced sensor geometry equates to higher bit density (bits/square inch of the rotating magnetic disk) read by the read head.

SUMMARY OF THE INVENTION

It is an object of the present invention to disclose a differential current-perpendicular-to-the-plane (CPP) GMR sensor having nonmagnetic high conductivity leads to achieve low lead resistance.

It is another object of the present invention to disclose a differential CPP GMR sensor having an improved delta R/R due to reduced parasitic resistance of the leads.

In accordance with the principles of the present invention, there is disclosed a differential CPP GMR sensor comprising a first spin valve (SV) sensor, a second SV sensor and a metal gap layer disposed between the first and the second SV sensors. The differential CPP SV sensor is sandwiched between thick first and second lead layers formed of non-magnetic high conductivity metals. In a first embodiment, the first SV sensor comprises an antiparallel (AP)-coupled first pinned layer adjacent to a first free layer and the second SV sensor comprises an AP-coupled second pinned layer adjacent to a second free layer. A metal gap layer is sandwiched between the first and second free layers. Because of the differential operation of the CPP GMR sensor of this invention, there is no need for shield layers to screen the sensor from stray magnetic fields. The shield layers are replaced with thick nonmagnetic lead layers having high conductivity to reduce the lead resistance of the sensor. Suitable materials for forming the leads include tungsten (W), gold (Au), rhodium (Rh), copper (Cu) and tantalum (Ta) because of their conductivity properties and because they are robust with respect to corrosion and smearing.

The half-bit length of magnetic data recorded on the magnetic media is arranged to be equal to the spacing between the first and second free layers of the differential CPP GMR sensor. With the half-bit length equal to the spacing between the free layers, the signals generated by the first and second spin valve sensors add due to the 180° phase difference of the first and second pinned layers. Because of the differential operation of this CPP sensor, stray magnetic fields do not generate any signal. Therefore, there is no need for ferromagnetic shields on either side of the differential CPP sensor of the present invention.

The above as well as additional objects, features, and advantages of the present invention will become apparent in the following detailed description.

BRIEF DESCRIPTION OF THE DRAWINGS

For a fuller understanding of the nature and advantages of the present invention, as well as of the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

The following description is the best embodiment presently contemplated for carrying out the present invention. This description is made for the purpose of illustrating the general principles of the present invention and is not meant to limit the inventive concepts claimed herein.

Figure 1:
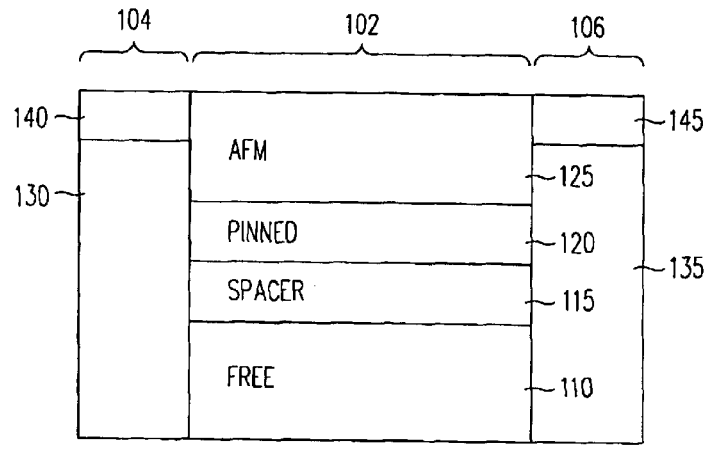
FIG. 1 is an air bearing surface view, not to scale, of a prior art SV sensor.
Figure 2:
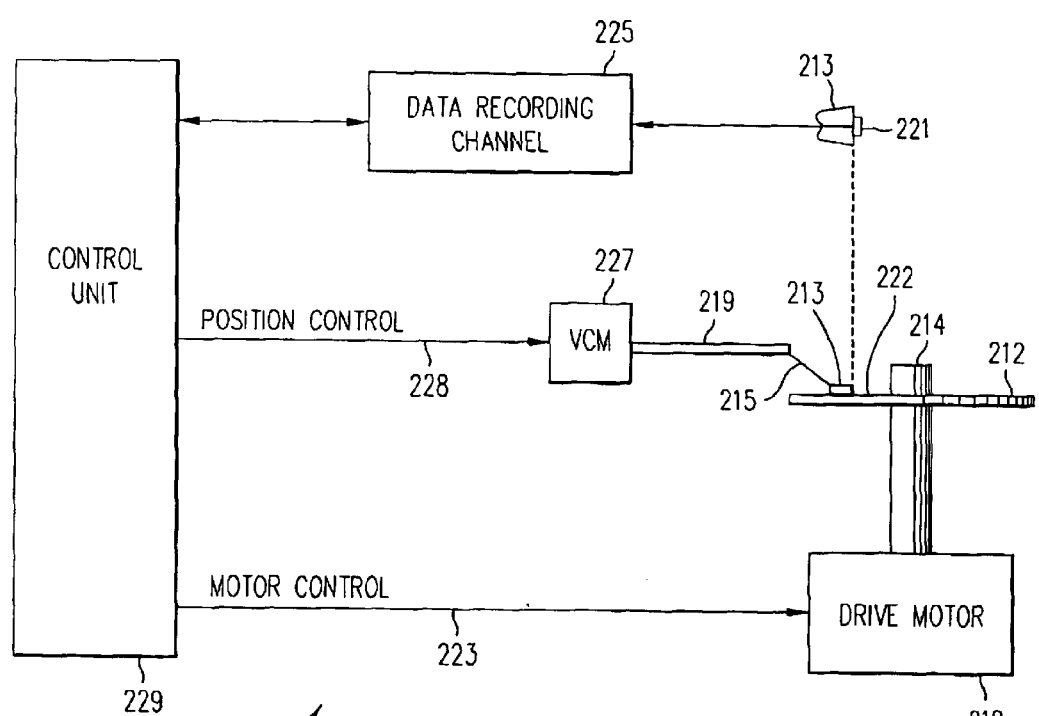
FIG. 2 is a simplified diagram of a magnetic recording disk drive system using the SV sensor of the present invention.

Referring now to FIG. 2, there is shown a disk drive 200 embodying the present invention. As shown in FIG. 2, at least one rotatable magnetic disk 212 is supported on a spindle 214 and rotated by a disk drive motor 218. The magnetic recording media on each disk is in the form of an annular pattern of concentric data tracks (not shown) on the disk 212.

At least one slider 213 is positioned on the disk 212, each slider 213 supporting one or more magnetic read/write heads 221 where the head 221 incorporates the SV sensor of the present invention. As the disks rotate, the slider 213 is moved radially in and out over the disk surface 222 so that the heads 221 may access different portions of the disk where desired data is recorded. Each slider 213 is attached to an actuator arm 219 by means of a suspension 215. The suspension 215 provides a slight spring force which biases the slider 213 against the disk surface 222. Each actuator arm 219 is attached to an actuator 227. The actuator as shown in FIG. 2 may be a voice coil motor (VCM). The VCM comprises a coil movable within a fixed magnetic field, the direction and speed of the coil movements being controlled by the motor current signals supplied by a controller 229.

During operation of the disk storage system, the rotation of the disk 212 generates an air bearing between the slider 213 (the surface of the slider 213 which includes the head 321 and faces the surface of the disk 212 is referred to as an air bearing surface (ABS)) and the disk surface 222 which exerts an upward force or lift on the slider. The air bearing thus counter-balances the slight spring force of the suspension 215 and supports the slider 213 off and slightly above the disk surface by a small, substantially constant spacing during normal operation.

The various components of the disk storage system are controlled in operation by control signals generated by the control unit 229, such as access control signals and internal clock signals. Typically, the control unit 229 comprises logic control circuits, storage chips and a microprocessor. The control unit 229 generates control signals to control various system operations such as drive motor control signals on line 223 and head position and seek control signals on line 228. The control signals on line 228 provide the desired current profiles to optimally move and position the slider 213 to the desired data track on the disk 212. Read and write signals are communicated to and from the read/write heads 221 by means of the recording channel 225. Recording channel 225 may be a partial response maximum likelihood (PRML) channel or a peak detect channel. The design and implementation of both channels are well known in the art and to persons skilled in the art. In the preferred embodiment, recording channel 225 is a PRML channel.

The above description of a typical magnetic disk storage system, and the accompanying illustration of FIG. 2 are for representation purposes only. It should be apparent that disk storage systems may contain a large number of disks and actuator arms, and each actuator arm may support a number of sliders.

Figure 3:
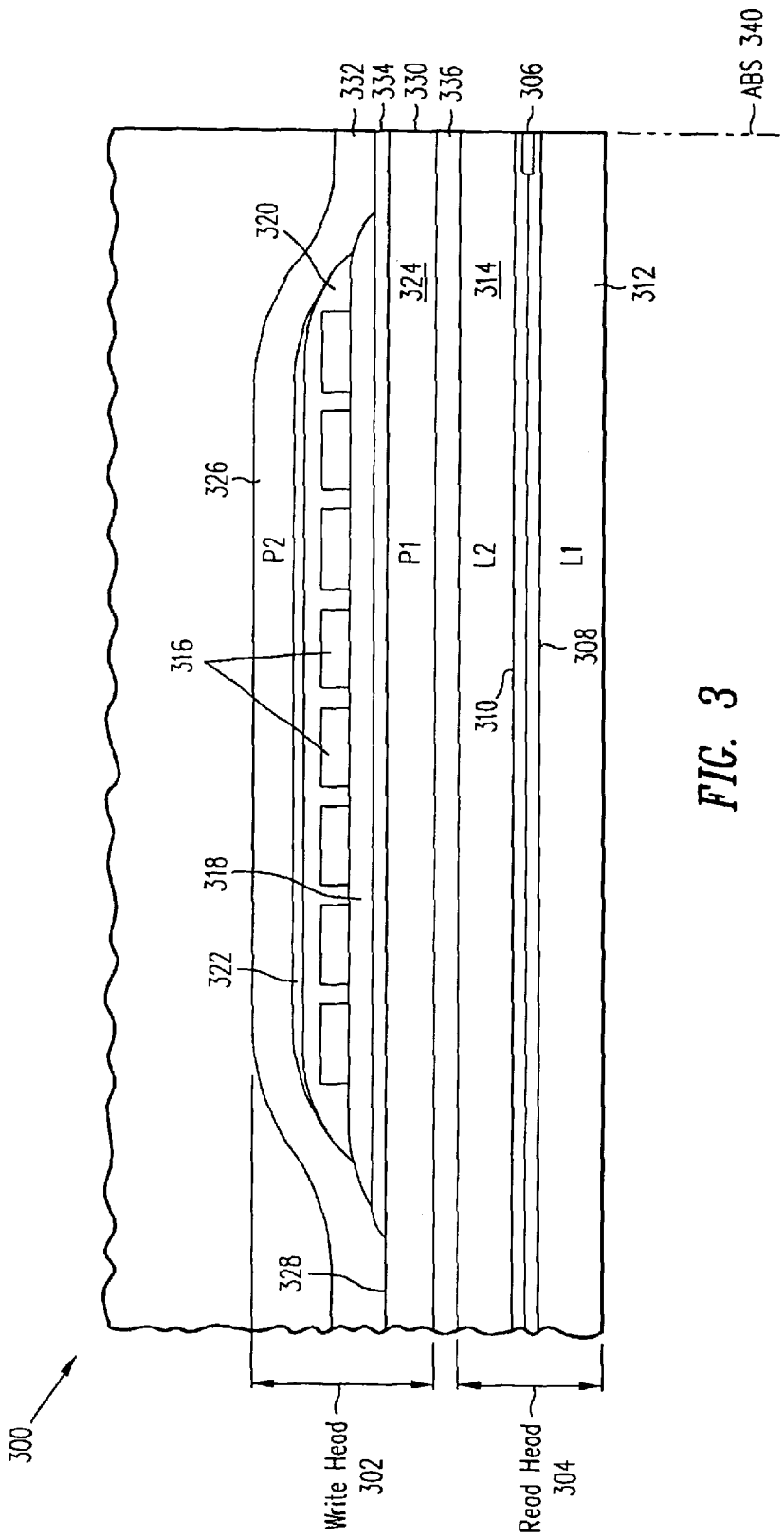
FIG. 3 is a vertical cross-section view, not to scale, of a "piggyback" read/write magnetic head.

FIG. 3 is a side cross-sectional elevation view of a "piggyback" magnetic read/write head 300, which includes a write head portion 302 and a read head portion 304, the read head portion employing a differential CPP GMR sensor 306 according to the present invention. The sensor 306 is sandwiched between nonmagnetic conductive first and second lead layers 312 and 314. First and second nonmagnetic insulative layers 308 and 310 separate the first and second lead layers in the region away from the sensor located at the ABS. In response to external magnetic fields, the resistance of the sensor 306 changes. A sense current Is conducted through the sensor causes these resistance changes to be manifested as potential changes. These potential changes are then processed as readback signals by the processing circuitry of the data recording channel 246 shown in FIG. 2.

The write head portion 302 of the magnetic read/write head 300 includes a coil layer 316 sandwiched between first and second insulation layers 318 and 320. A third insulation layer 322 may be employed for planarizing the head to eliminate ripples in the second insulation layer 320 caused by the coil layer 316. The first, second and third insulation layers are referred to in the art as an insulation stack. The coil layer 316 and the first, second and third insulation layers 38, 320 and 322 are sandwiched between first and second pole piece layers 324 and 326. The first and second pole piece layers 324 and 326 are magnetically coupled at a back gap 328 and have first and second pole tips 330 and 332 which are separated by a write gap layer 334 at the ABS 340. An insulation layer 336 is located between the second shield layer 314 and the first pole piece layer 324. Since the second shield layer 314 and the first pole piece layer 324 are separate layers this read/write head is known as a "piggyback" head.

FIRST EXAMPLE

Figure 4:
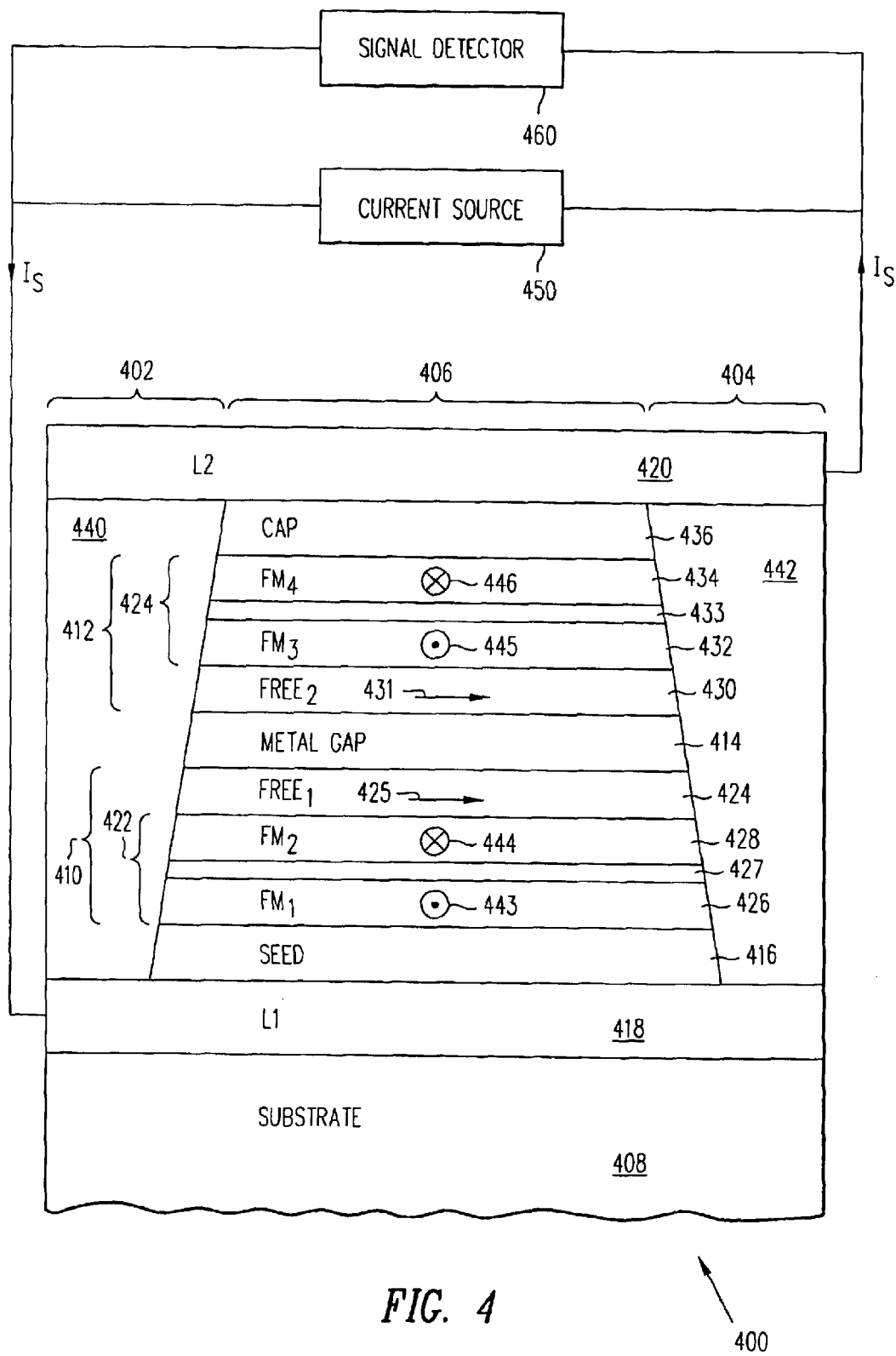
FIG. 4 is an air bearing surface view, not to scale, of an embodiment of a differential CPP GMR sensor of the present invention.

FIG. 4 depicts an air bearing surface (ABS) view, not to scale, of a differential CPP GMR sensor 400 according to a first embodiment of the present invention. The sensor 400 comprises end regions 402 and 404 separated from each other by a central region 406. The active region of the CPP sensor comprises a first SV sensor 410 and a second SV sensor 412 formed in the central region 406. The first and second SV sensors are separated by a metal gap layer 414. The first SV sensor 410 is formed on a seed layer 416 deposited on a first lead layer L1 418 in the central region 406. The seed layer 416 a nonmagnetic metal layer deposited to modify the crystallographic texture or grain size of subsequent layers. The first lead layer 418 is a layer of nonmagnetic highly conductive metal such as tungsten (W), or alternatively gold (Au), rhodium (Rh), copper (Cu) or tantalum (Ta) deposited on a substrate 408 and extending over the central region 406 and end regions 402 and 404. Alternatively, the first lead layer 418 may comprise a multilayer of two or more layers, each layer being formed from any of the above listed conductive metals. For example the first lead layer may comprise a bilayer formed of a Ta layer and a Au layer or a bilayer formed of a Ta layer and a Rh layer. The substrate 408 can be any suitable substance including glass, semiconductor material, or a ceramic substance such as alumina ($Al_2O_3$).

The first SV sensor 410 comprises a first pinned layer 422 over the seed layer 416 and a ferromagnetic first free layer 424 deposited over the first pinned layer. The first pinned layer 422 is an AP-coupled layer comprising a first ferromagnetic (FM1) layer 426 adjacent to the seed layer 416, a second ferromagnetic (FM2) layer 428 and an antiparallel coupling (APC) layer 427 sandwiched between the FM1 and FM2 layers 426 and 428. The APC layer 427 is formed of a nonmagnetic material, preferably ruthenium (Ru), that allows the FM1 and FM2 layers 426 and 428 to be strongly coupled together antiferromagnetically.

The second SV sensor 412 comprises a ferromagnetic second free layer 430 deposited over the metal gap layer 414 and a second pinned layer 424 deposited over the second free layer. The second pinned layer 424 is an AP-coupled layer comprising a third ferromagnetic (FM3) layer 432 adjacent to the second free layer 430, a fourth ferromagnetic (FM4) layer 434 and an antiparallel coupling (APC) layer 433 sandwiched between the FM3 and FM4 layers 432 and 434. The APC layer 433 is formed of a nonmagnetic material, preferably ruthenium (Ru), that allows the FM3 and FM4 layers 432 and 434 to be strongly coupled together antiferromagnetically. A cap layer 436 is deposited over the second pinned layer 424.

Insulator layers 440 and 442 of electrically insulating material such as aluminum oxide are formed in the end regions 402 and 404, respectively, on the first lead layer 418 and in abutting contact with the CPP sensor layers in the central region 406. A second lead layer L2 420 of nonmagnetic highly conductive metal such as tungsten (W), or alternatively gold (Au), rhodium (Rh), copper (Cu) or tantalum (Ta), is deposited over the cap layer 436 in the central region 406 and over the insulator layers 440 and 442 in the end regions 402 and 404. Alternatively, the second lead layer 420 may comprise a multilayer of two or more layers, each layer being formed from any of the above listed conductive metals. For example, the first lead layer may comprise a bilayer formed of a Ta layer and a Au layer or a bilayer formed of a Ta layer and a Rh layer.

If longitudinal stabilization of the magnetic domain states of the first and second free layers 424 and 430 is desired, hard bias layers may be provided in the end regions 402 and 404 as is known in the art. IBM's U.S. Pat. No. 5,720,410 granted to Fontana et al. describes such a longitudinal biasing method.

The first and second lead layers 418 and 420 provide electrical connections for the flow of a sensing current $I_s$ from a current source 450 to the CPP sensor 400. A signal detector 460 which is electrically connected to the first and second lead layers 418 and 420 senses the change in resistance due to changes induced in the first and second free layers 424 and 430, respectively, by the external magnetic field (e.g., field generated by a data bit stored on a disk). The external magnetic field acts to rotate the direction of magnetization of the first and second free layers relative to the direction of magnetization of the first and second pinned layers 422 and 424, respectively, which are preferably pinned perpendicular to the ABS. The signal detector 460 preferably comprises a partial response maximum likelihood (PRML) recording channel for processing the signal detected by the MTJ sensor 400. Alternatively, a peak detect channel or a maximum likelihood channel (e.g., 1,7 ML) may be used. The design and implementation of the aforementioned channels are known to those skilled in the art. The signal detector 460 also includes other supporting circuitries such as a preamplifier (electrically placed between the sensor and the channel) for conditioning the sensed resistance changes as is known to those skilled in the art.

The sensor 400 may be fabricated in a magnetron sputtering or an ion beam sputtering system to sequentially deposit the multilayer structure shown in FIG. 4. The first lead layer 418 of tungsten (W), or alternatively gold (Au), rhodium (Rh), copper (Cu), tantalum (Ta) or combinations of these materials, having a thickness in the range of 500–2000 Å is deposited on the substrate 408. After deposition of the first lead layer a chemical/mechanical polish (CMP) is carried out to provide a smooth surface for deposition of the layer structure of the CPP SV sensor. For the best CMP results, the use of tungsten to form the first lead layer is preferred. The seed layer 416, the first SV sensor 410, the metal gap layer 414 and the second SV sensor 412 are sequentially deposited over the first lead layer 418 in the presence of a longitudinal or transverse magnetic field of about 40 Oe to orient the easy axis of all the ferromagnetic layers. The seed layer 416 formed of a nonmagnetic metal, preferably tantalum (Ta), having a thickness of about 30 Å is deposited on the first lead layer 418. The FM1 layer 426 formed of Ni—Fe having a thickness in the range of 20–50 Å is deposited on the seed layer 416. The APC layer 427 preferably formed of ruthenium (Ru) having a thickness of about 6 Å is deposited on the FM1 layer 426. The FM2 layer 428 formed of Ni—Fe having a thickness in the range of 20–50 Å is deposited on the APC layer 427. The thickness of the FM1 layer 426 is chosen to be greater than the thickness of the FM2 layer 428 so that magnetization 443 (shown as the head of an arrow pointing out of the plane of the paper) of the FM1 layer 426 is greater than the magnetization 444 (shown as the tail of an arrow pointing into the plane of the paper) of the FM2 layer 428. As a result, the direction of the net magnetization of the AP-coupled first pinned layer 422 has the same direction as the magnetization 443 of the FM1 layer 426. The first free layer 424 formed of Ni—Fe having a thickness of 20–40 Å is deposited on the FM2 layer 428. Alternatively, the free layer 428 may be formed of a laminated multilayer comprising a ferromagnetic interface layer formed of cobalt (Co) having a thickness of about 5 Å deposited on the FM1 layer 426 and a ferromagnetic layer formed of Ni—Fe having a thickness of 20–30 Å deposited on the interface layer.

The metal gap layer 414 formed of a nonmagnetic metal is deposited over the first free layer 424. The metal gap layer provides a read gap separating the free layers of the first and second SV sensors 410 and 412 of the differential CPP sensor 400. With the differential sensor the recorded magnetic half-bit length is arranged to equal the spacing between the first and second free layers 424 and 430. The magnetization directions 425 and 431 of first and second free layers 424 and 430, respectively, are arranged to have the same direction, either to the right as shown in FIG. 4 or, alternatively, to the left. In future high density technology applications the metal gap layer will have a thickness less than 500 Å.

The second free layer 430 formed of Ni—Fe having a thickness of about 20–40 Å is deposited on the metal gap layer 414. Alternatively, the free layer 430 may be formed of a laminated multilayer comprising a ferromagnetic layer formed of Ni—Fe having a thickness of 20–30 Å deposited on the metal gap layer 414 and a ferromagnetic interface layer formed of cobalt (Co) having a thickness of about 5 Å deposited on the ferromagnetic layer of Ni—Fe. The FM3 layer 432 formed of Ni—Fe having a thickness in the range of 20–50 Å is deposited on the second free layer 432. The APC layer 433 preferably formed of ruthenium (Ru) having a thickness of about 6 Å is deposited on the FM3 layer 432. The FM4 layer 434 formed of Ni—Fe having a thickness in the range of 20–50 Å is deposited on the APC layer 433. The thickness of the FM3 layer 432 is chosen to be greater than the thickness of the FM4 layer 434 so that magnetization 445 (shown as the head of an arrow pointing out of the plane of the paper) of the FM3 layer 432 is greater than the magnetization 446 (shown as the tail of an arrow pointing into the plane of the paper) of the FM4 layer 434. As a result, the direction of the net magnetization of the AP-coupled first pinned layer 422 has the same direction as the magnetization 445 of the FM3 layer 432. A cap layer 436 of tungsten having a thickness of about 30 Å, formed on the FM4 layer 434 completes the central region 406 of the CPP sensor 400. The second lead layer 420 of tungsten (W), or alternatively gold (Au), rhodium (Rh), copper (Cu), tantalum (Ta) or combinations of these materials, having a thickness in the range of 500–2000 Å is deposited over the cap layer 436 in the central region 406 and over the insulation layers 440 and 442 in the end regions 402 and 404.

An advantage of the differential CPP GMR sensor 400 of the present invention is that because of the differential operation of the sensor ferromagnetic shields are not required to prevent stray magnetic fields from causing spurious signals. Elimination of the need for shields allows the use of thick high conductivity leads, L1 and L2, to achieve low lead resistance. The low lead resistance provides higher delta R/R for the sensor because parasitic resistance (resistance not contributing to delta R) is lowered.

Another advantage of the differential CPP sensor 400 of the present invention is that the first and second pinned layers 422 and 424 of the first and second SV sensors 410 and 412, respectively, are arranged to be 180° out of phase to provide signal addition for perpendicular or longitudinal transitions where the half-bit length is set equal to the thickness of the metal gap layer 414 (read gap). In order to accomplish this phase relationship of the pinned layers, the thicknesses of ferromagnetic layers FM1, FM2, FM3 and FM4 are selected so that FM2 and FM3 become 180° out of phase during a reset process. This phase relationship may be achieved by choosing the magnetic thickness of FM1 to be greater than the thickness of FM2 and the magnetic thickness of FM3 to be greater than the thickness of FM4. Alternatively, the thickness of FM2 may be chosen to be greater than the thickness of FM1 and the thickness of FM4 may be chosen to be thicker than the thickness of FM3. The magnetic anisotropy differences between FM1, FM2, FM3 and FM4 may also be used to achieve the desired magnetic orientation of these layers.

SECOND EXAMPLE

Figure 5:
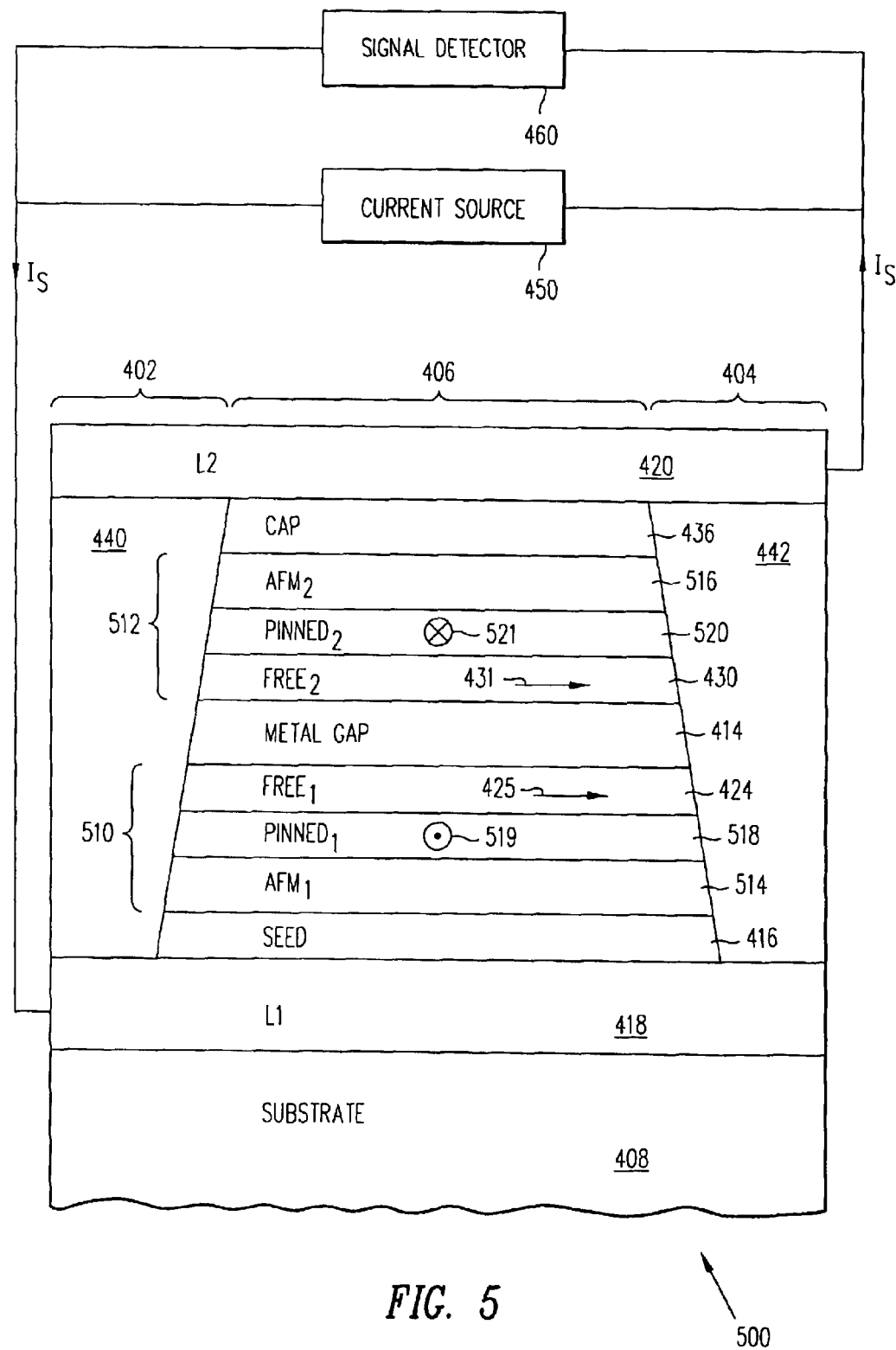
FIG. 5 is an air bearing surface view, not to scale, of a second embodiment of a differential CPP GMR sensor of the present invention.

FIG. 5 shows an air bearing surface (ABS) view, not to scale, of a differential CPP sensor 500 according to another embodiment of the present invention. The CPP SV sensor 500 differs from the CPP SV sensor 400 shown in FIG. 4 in having first and second SV sensors 510 and 512 comprising simple pinned layers 518 and 520 with first and second antiferromagnetic (AFM) pinning layers 514 and 516, respectively, instead of the self-pinned AP-coupled layers 422 and 424 of the SV sensor 400. The first AFM layer 514 of Pt—Mn or Ir—Mn having a thickness in the range of 50–200 Å is deposited over the seed layer 416. The first pinned layer 518 of Co—Fe having a thickness in the range of 20–40 Å is deposited over the first AFM layer. The first free layer 424, metal gap layer 414 and second free layer 430 are sequentially deposited over the first pinned layer 518. The second pinned layer 520 of Co—Fe having a thickness in the range of 20–40 Å is deposited over the second free layer and the second AFM layer 516 of Pt—Mn or Ir—Mn having a thickness in the range of 50–200 Å is deposited over the second pinned layer 520. The cap layer 436 is deposited over the second AFM layer 516.

The first AFM layer 514 is set at elevated temperature in the presence of a strong magnetic field, as is known to the art, to pin the direction of the magnetization 519 (shown as the head of an arrow pointing out of the plane of the paper) of the first pinned layer 518 perpendicular to the ABS. The second AFM layer 516 is similarly set to pin the direction of the magnetization 521 (shown as the tail of an arrow pointing into the plane of the paper) of the second pinned layer 520 in an opposite direction to the magnetization 519 of the first pinned layer 518. Alternatively, the first pinned layer 518 may be pinned so that the magnetization 519 is directed into the plane of the paper and the second pinned layer 520 may be pinned so that the magnetization 521 is directed out of the plane of the paper. With the half-bit length equal to the spacing between the free layers, the signals generated by the first and second spin valve sensors of the differential CPP sensor 500 add due to the 180° phase difference of the magnetizations of the first and second pinned layers. The setting of the first and second AFM layers 514 and 516 180° out of phase may require the use of different AFM materials for each layer and setting procedures known in the art.

THIRD EXAMPLE

Figure 6:
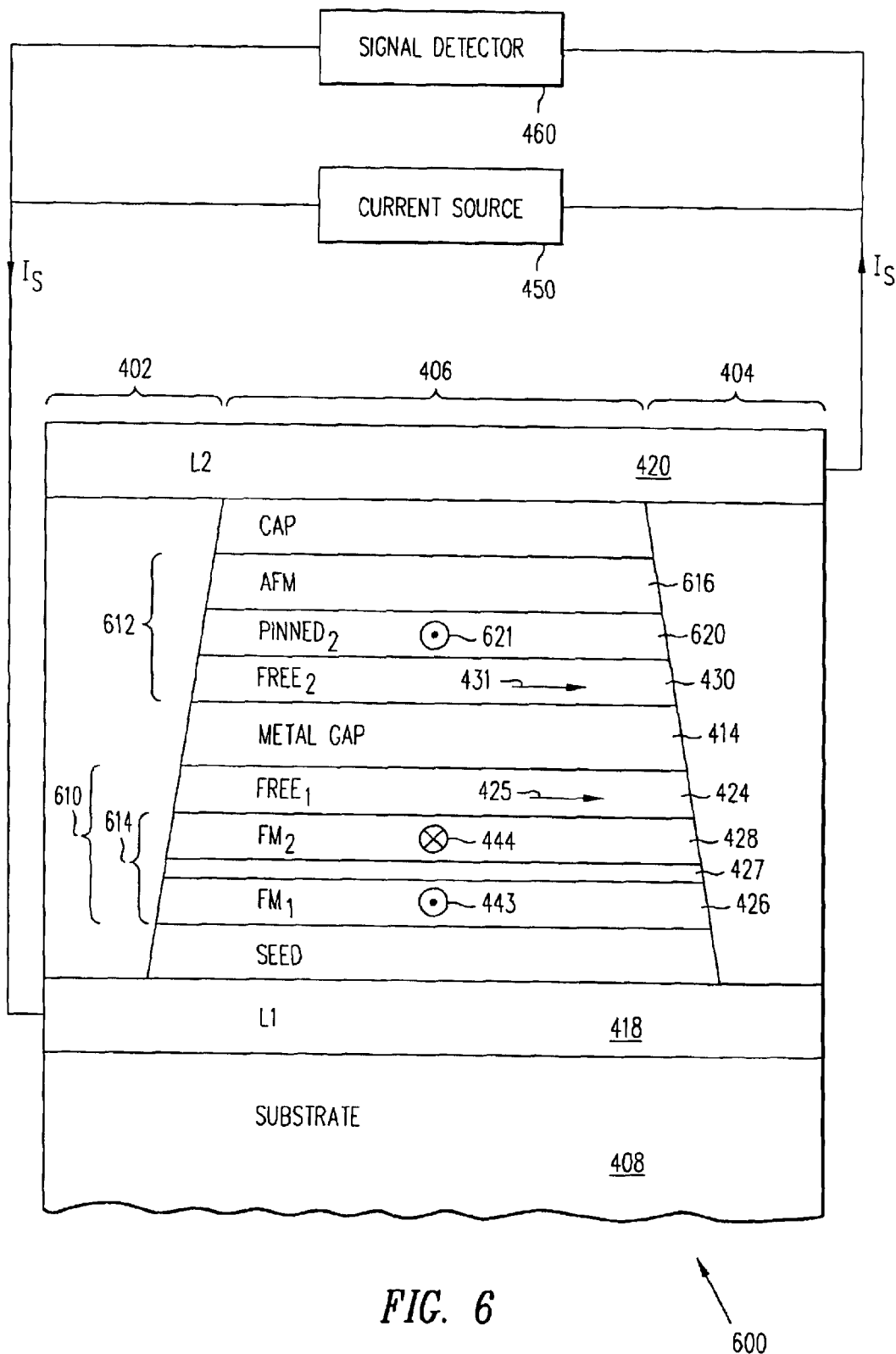
FIG. 6 is an air bearing surface view, not to scale, of a third embodiment of a differential CPP GMR sensor of the present invention.

FIG. 6 shows an air bearing surface (ABS) view, not to scale, of a differential CPP sensor 600 according to another embodiment of the present invention. The CPP SV sensor 600 differs from the CPP SV sensor 400 shown in FIG. 4 in having a first SV sensor 610 comprising a self-pinned AP-coupled first pinned layer 614 and a second SV sensor 612 comprising a simple pinned layer 620 with an antiferromagnetic (AFM) pinning layer 616 instead of the two self-pinned AP-coupled layers 422 and 424 of the SV sensor 400. The SV sensor 612 having a simple pinned layer and an AFM pinning layer is preferably the top sensor in the stack forming the differential CPP sensor 600 but, alternatively, may be configured as the bottom sensor of the differential CPP sensor. The first SV sensor 610 comprising first pinned layer 614 and first free layer 424 is the same as first SV sensor 410 of CPP sensor 400. The second pinned layer 620 of the second sensor 612 is formed of Co—Fe having a thickness in the range of 20–40 Å deposited over the second free layer 430. The AFM layer 616 of Pt—Mn or Ir—Mn having a thickness in the range of 50–200 Å is deposited over the second pinned layer 620. The cap layer 436 is deposited over the AFM layer 616.

The AFM layer 616 is set at elevated temperature in the presence of a strong magnetic field, as is known to the art, to pin the direction of the magnetization 621 (shown as the head of an arrow pointing out of the plane of the paper) of the second pinned layer 620 perpendicular to the ABS and in an opposite direction to the magnetization 444 of the FM2 layer 428 of the first pinned layer 614. Alternatively, the FM2 layer 428 may be pinned so that the magnetization 444 is directed into the plane of the paper and the second pinned layer 620 may be pinned so that the magnetization 621 is directed out of the plane of the paper. With the half-bit length equal to the spacing between the free layers, the signals generated by the first and second spin valve sensors of the differential CPP sensor 600 add due to the 180° phase difference of the magnetizations of the FM2 layer 428 and the second pinned layer 620.

While the present invention has been particularly shown and described with reference to the preferred embodiments, it will be understood to those skilled in the art that various changes in form and detail may be made without departing from the spirit, scope and teaching of the invention. Accordingly, the disclosed invention is to be considered merely as illustrative and limited only as specified in the appended claims.

I claim:

1. A differential giant magnetoresistive (GMR) sensor, comprising:
   a first spin valve (SV) sensor, comprising:
      a first pinned layer, including:
         a first ferromagnetic (FM1) layer;
         a second ferromagnetic (FM2) layer;
         an antiparallel coupling (APC) layer disposed between the FM1 and FM2 layers; and
         a first free layer adjacent to the FM2 layer on a side opposite the APC layer;
   a second spin valve (SV) sensor, comprising:
      a second pinned layer, including:
         a third ferromagnetic (FM3) layer;
         a fourth ferromagnetic (FM4) layer;
         an antiparallel coupling (APC) layer disposed between the FM3 and FM4 layers; and
      a second free layer adjacent to the FM3 layer on a side opposite the APC layer;
   a metal gap layer disposed between the first and second free layers; and
   wherein the first and second SV sensors and the metal gap layer are disposed between nonmagnetic first and second lead layers, wherein the metal gap layer provides a read gap separating the first and second free layers by a spacing equal to the recorded magnetic half-bit length.

2. A differential giant magnetoresistive (GMR) sensor, comprising:
   a first spin valve (SV) sensor, comprising:
      a first antiferromagnetic layer;
      a first free layer; and
      a first pinned layer disposed between the first antiferromagnetic layer and the first free layer;
   a second spin valve (SV) sensor, comprising:
      a second antiferromagnetic layer;
      a second free layer; and
      a second pinned layer disposed between the second antiferromagnetic layer and the second free layer;
   a metal gap layer disposed between the first and second free layers,
   wherein the first and second SV sensors and the metal gap layer are disposed between nonmagnetic first and second lead layers, and wherein the metal gap layer provides a read gap separating the first and second free layers by a spacing equal to the recorded magnetic half-bit length.

3. A differential giant magnetoresistive (GMR) sensor, comprising:
   a first spin valve (SV) sensor, comprising:
      a first pinned layer, including:
         a first ferromagnetic (FM1) layer;
         a second ferromagnetic (FM2) layer;
         an antiparallel coupling (APC) layer disposed between the FM1 and FM2 layers; and
      a first free layer adjacent to the FM2 layer on a side opposite the APC layer;
   a second spin valve (SV) sensor, comprising:
      an antiferromagnetic layer;
      a second free layer;
      a second pinned layer disposed between the antiferromagnetic layer and the second free layer;
   a metal gap layer disposed between the first and second free layers; and
   wherein the first and second SV sensors and the metal gap layer are disposed between nonmagnetic first and second lead layers, wherein the metal gap layer provides a read gap separating the first and second free layers by a spacing equal to the recorded magnetic half-bit length.

4. A magnetic read/write head comprising:
   a write head including:
      at least one coil layer and an insulation stack, the coil layer being embedded in the insulation stack;
      first and second pole piece avers connected at a back gap and having pole tips with edges forming a portion of an air bearing surface (ABS);
      the insulation stack being sandwiched between the first and second pole piece layers; and
      a write gap layer sandwiched between the pole tips of the first and second pole piece layers and forming a portion of the ABS;
   a read head including:
      a differential giant magnetoresistance (GMR) sensor, the GMR sensor being sandwiched between first and second lead layers, the GMR sensor comprising:

a first spin valve (SV) sensor, comprising:
    a first pinned layer, including:
        a first ferromagnetic (FM1) layer;
        a second ferromagnetic (FM2) layer;
        an antiparallel coupling (APC) layer disposed between the FM1 and FM2 layers; and
    a first free layer adjacent to the FM2 layer on a side opposite the APC layer;
a second spin valve (SV) sensor, comprising:
    a second pinned layer, including:
        a third ferromagnetic (FM3) layer;
        a fourth ferromagnetic (FM4) layer;
        an antiparallel coupling (APC) layer disposed between the FM3 and FM4 layers; and
    a second free layer adjacent to the FM3 layer on a side opposite the APC layer;
a metal gap layer disposed between the first and second free layers; and
wherein the first and second SV sensors and the metal gap layer are disposed between nonmagnetic first and second lead layers; and
an insulation layer disposed between the second lead layer of the read head and the first pole piece layer of the write head, wherein the metal gap layer provides a read gap separating the first and second free layers by a spacing equal to the recorded magnetic half-bit length.

5. A magnetic read/write head comprising:
a write head including;
    at least one coil layer and an insulation stack, the coil layer being embedded in the insulation stack;
    first and second pole piece layers connected at a back gap and having pole tips with edges forming a portion of an air bearing surface (ABS);
    the insulation stack being sandwiched between the first and second pole piece layers; and
    a write gap layer sandwiched between the pole ties of the first and second pole piece layers and forming a portion of the ABS;
a read head including:
    a differential giant magnetoresistance (GMR) sensor, the GMR sensor being sandwiched between first and second lead layers, the GMR sensor comprising:
        a first spin valve (SV) sensor, comprising:
            a first antiferromagnetic layer;
            a first free layer; and
            a first pinned layer disposed between the first antiferromagnetic layer and the first free layer;
        a second spin valve (SV) sensor, comprising:
            a second antiferromagnetic layer;
            a second free layer; and
            a second pinned layer disposed between the second antiferromagnetic layer and the second free layer;
        a metal gap layer disposed between the first and second free layers; and
        wherein the first and second SV sensors and the metal gap layer are disposed between nonmagnetic first and second lead layers; and
an insulation layer disposed between the second lead layer of the read head and the first pole piece layer of the write head, wherein the metal gap layer provides a read gap separating the first and second free layers by a spacing equal to the recorded magnetic half-bit length.

6. A magnetic read/write head comprising:
a write head including;
    at least one coil layer and an insulation stack, the coil layer being embedded in the insulation stack;
    first and second pole piece layers connected at a back pap and having pole tips with edges forming a portion of an air bearing surface (ABS);
    the insulation stack being sandwiched between the first and second pole piece layers; and
    a write gap layer sandwiched between the pole tips of the first and second pole piece layers and forming a portion of the ABS;
a read head including:
    a differential giant magnetoresistance (GMR) sensor, the GMR sensor being sandwiched between first and second lead layers, the GMR sensor comprising:
        a first spin valve (SV) sensor, comprising:
            a first pinned layer, including:
                a first ferromagnetic (FM1) layer;
                a second ferromagnetic (FM2) layer;
                an antiparallel coupling (APC) layer disposed between the FM1 and FM2 layers; and
            a first free layer adjacent to the FM2 layer on a side opposite the APC layer;
        a second spin valve (SV) sensor, comprising:
            an antiferromagnetic layer;
            a second free layer;
            a second pinned layer disposed between the antiferromagnetic layer and the second free layer;
        a metal gap layer disposed between the first and second free layers; and
        wherein the first and second SV sensors and the metal gap layer are disposed between nonmagnetic first and second lead layers; and
an insulation layer disposed between the second lead layer of the read head and the first pole piece layer of the write head, wherein the metal gap layer provides a read gap separating the first and second free layers by a spacing equal to the recorded magnetic half-bit length.

* * * * *

UNITED STATES PATENT AND TRADEMARK OFFICE
CERTIFICATE OF CORRECTION

| | |
|---|---|
| PATENT NO. | : 6,927,948 B2 |
| APPLICATION NO. | : 10/349552 |
| DATED | : August 9, 2005 |
| INVENTOR(S) | : Hardayal Singh Gill |

Page 1 of 1

It is certified that error appears in the above-identified patent and that said Letters Patent is hereby corrected as shown below:

Column 10, Claim 4, Line 56 - change "avers" to --layers--
Column 11, Claim 5, Line 36 - change "ties" to --tips--
Column 12, Claim 6, Line 14 - change ";" to --:--
Column 12, Claim 6, Line 18 - change "pap" to --gap--

Signed and Sealed this

Twelfth Day of August, 2008

JON W. DUDAS
*Director of the United States Patent and Trademark Office*